United States Patent
Nielsen et al.

(10) Patent No.: US 6,253,229 B1
(45) Date of Patent: Jun. 26, 2001

(54) HOTSPOTS ONLY INTERFACES TO LINKS IN HYPERTEXT DOCUMENT PAGES IN NETWORK DISPLAY STATIONS

(75) Inventors: Christopher Robbins Nielsen; Rick Lee Poston; Stephen Gray Stair; I-Hsing Tsao, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/974,585

(22) Filed: Nov. 19, 1997

(51) Int. Cl.$^7$ .................................................... G06F 15/16
(52) U.S. Cl. ........................ 709/203; 709/217; 709/219
(58) Field of Search .................................. 709/203, 206, 709/217, 218, 219, 200; 707/2, 500, 501; 345/357

(56) References Cited

U.S. PATENT DOCUMENTS

| | | | |
|---|---|---|---|
| 5,530,852 | * | 6/1996 | Meske, Jr. et al. ................. 709/206 |
| 5,721,897 | * | 2/1998 | Rubinstein .............................. 707/2 |
| 5,737,619 | * | 4/1998 | Judson ................................ 707/500 |
| 5,742,768 | * | 4/1998 | Gennaro et al. ..................... 709/203 |
| 5,790,122 | * | 8/1998 | Cecchini et al. .................... 345/357 |
| 5,806,077 | * | 9/1998 | Wecker ............................... 707/501 |
| 5,890,172 | * | 3/1999 | Borman et al. ...................... 707/501 |
| 5,974,445 | * | 10/1999 | Pivnichny et al. .................. 709/203 |

* cited by examiner

Primary Examiner—Ayaz Sheikh
Assistant Examiner—Philip B. Tran
(74) Attorney, Agent, or Firm—Jerry B. Kraft; Mark E. McBurney

(57) ABSTRACT

A data processor controlled user interactive display system for displaying hypertext documents, each including a sequence of display screen pages received over a communications network such as the World Wide Web. Each of the pages contains a plurality of hotspots responsive to user interactive pointing means to display a linked document. The system provides display pages in alternate versions wherein only the hotspots on the page are displayed. It includes means for selecting said alternate version for display and means, responsive to said means for selecting, for transmitting said alternate version containing hotspots only to a receiving display station. The selection of the alternate version is made through a browser at the receiving display station and carried out by the network server which fetches said documents from said network and transmits said fetched documents to said receiving station and has said means for providing said display page in said alternate version having hotspots only and said means, responsive to said means for selecting, for transmitting said alternate version.

11 Claims, 4 Drawing Sheets

HOTSPOTS ONLY INTERFACES TO LINKS IN HYPERTEXT DOCUMENT PAGES IN NETWORK DISPLAY STATIONS

TECHNICAL FIELD

The present invention relates to computer managed communication networks and particularly to ease of use of interactive computer controlled display interfaces with hotspots in received hypertext documents which interactively link users from such documents to other documents and programs.

BACKGROUND OF THE INVENTION

The 1990's decade has been marked by a societal technological revolution driven by the convergence of the data processing industry with the consumer electronics industry. Like all such revolutions, it unleashed a significant ripple effect of technological waves. The effect has in turn driven technologies which have been known and available but relatively quiescent over the years. A major one of these technologies is the internet-related distribution of documents, media and programs. The convergence of the electronic entertainment and consumer industries with data processing exponentially accelerated the demand for wide ranging communication distribution channels, and the World Wide Web or internet which had quietly existed for over a generation as a loose academic and government data distribution facility reached "critical mass" and commenced a period of phenomenal expansion. With this expansion, businesses and consumers have direct access to all matter of documents, media and computer programs.

In addition, Hypertext Markup Language (HTML), which had been the documentation language of the internet World Wide Web for years offered direct links between pages and other documentation on the Web and a variety of related data sources which were at first text and then evolved into media, i.e. "hypermedia". This even further exploded the use of the internet or World Wide Web. It was now possible for the Web browser or wanderer to spend literally hours going through document after document in often less than productive excursions through the Web. These excursions often strained the users' time and resources. In order for the internet to mature from its great expectations to solid commercial fruition, it will be necessary for the internet to greatly reduce its drain on time and related resources. A significant source of this drain is in the Web page, the basic document page of the Web.

In the case of Web pages, we do not have the situation of a relatively small group of professional designers working out the human factors; rather in the era of the Web, anyone and everyone can design a Web page. As a result, pages are frequently designed by developers without usability skills. Often the pages include elaborate image files which require relatively great amounts of time to download at the receiving station. In addition, there appears to be an increasing amount of advertising on the Web wherein the seeker of information at times has to be subject to "commercials" often in the time and resource taxing image formats.

The present invention provides a solution to this problem of downloaded bloated Web pages. The invention gives the user at the receiving workstation the power to drastically limit the incoming Web page information which would be time and resource consuming. The invention permits the user to operate in a "hotspots only" mode which permits the user to download and display only the hypertext hotspots or links which will link the user to other Web pages or data sources. This is particularly valuable to the user who has definite data sources which he is seeking or has previously wandered through pages and subsequently recalls certain sources which he deems to be of value. It is also helpful to a user who wishes to get an advance abstract of an area which he is considering exploring. By quickly going through several pages, he gets a capsule view which should help him to decide whether he is going up the right stream.

SUMMARY OF THE INVENTION

The present invention relates to a computer controlled display system for displaying documents and particularly for displaying Web pages and related documentation on receiving display workstations in a computer managed communication network. Users access these Web pages via a plurality of such data processor controlled interactive display stations receiving documents transmitted to said display stations from locations remote from said stations. Such documents include a sequence of hypertext display pages made up of text and images which may be very complex. Each page also contains a plurality of hotspots of varying dimensions, each of said hotspots being responsive to user interactive pointing means to display a linked document or information source. The invention involves restructuring each page in the received document so that all images and text are removed from the received page except for the hotspots. The invention accomplishes this by providing said display page in an alternate version wherein only the hotspots on the page are displayed together with means for selecting said alternate version for display. In response to these selecting means, the alternate version containing hotspots only is transmitted to a receiving display station. The means for selecting the alternate version with hotspots only is preferably located at the receiving display station as part of an interactive network browser at that display station. For best results, the browser at the display station through which the alternate version is selected coacts with a network server which has means for fetching said documents from said network and transmitting said fetched documents to said receiving station together with said means for providing said display page in said alternate version having hotspots only, and said means, responsive to said means for selecting, for transmitting said alternate version.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable. Reference has also been made to the applicability of the present invention to a global network such as the internet. For details on internet nodes, objects and links, reference is made to the text, *Mastering the Internet*, G. H. Cady et al., published by Sybex Inc., Alameda, Calif., 1996.

Any data communication system which interconnects or links computer controlled systems with various sites defines a communications network. A network may be as simple as two linked computers or it may be any combination of LANS (Local Area Networks) or WANS (Wide Area Networks). Of course, the internet or World Wide Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. The HTML language is described in detail in "Just Java", 2nd Edition, Peter van der Linden, Sun Microsystems, 1997, particularly Chapter 7, pp. 249–268, dealing with the handling of Web pages with embedded hotspot activated linkages and also in the text, "Mastering the Internet", Cady et al., published by Sybex, San Francisco, 1996, particularly pp. 637–642 on HTML in the formation of Web pages. In addition, significant aspects of this invention will involve Web browsers. A general and comprehensive description of browsers may be found in the aforementioned Cady et al. text, pp. 291–313.

Figure 1:
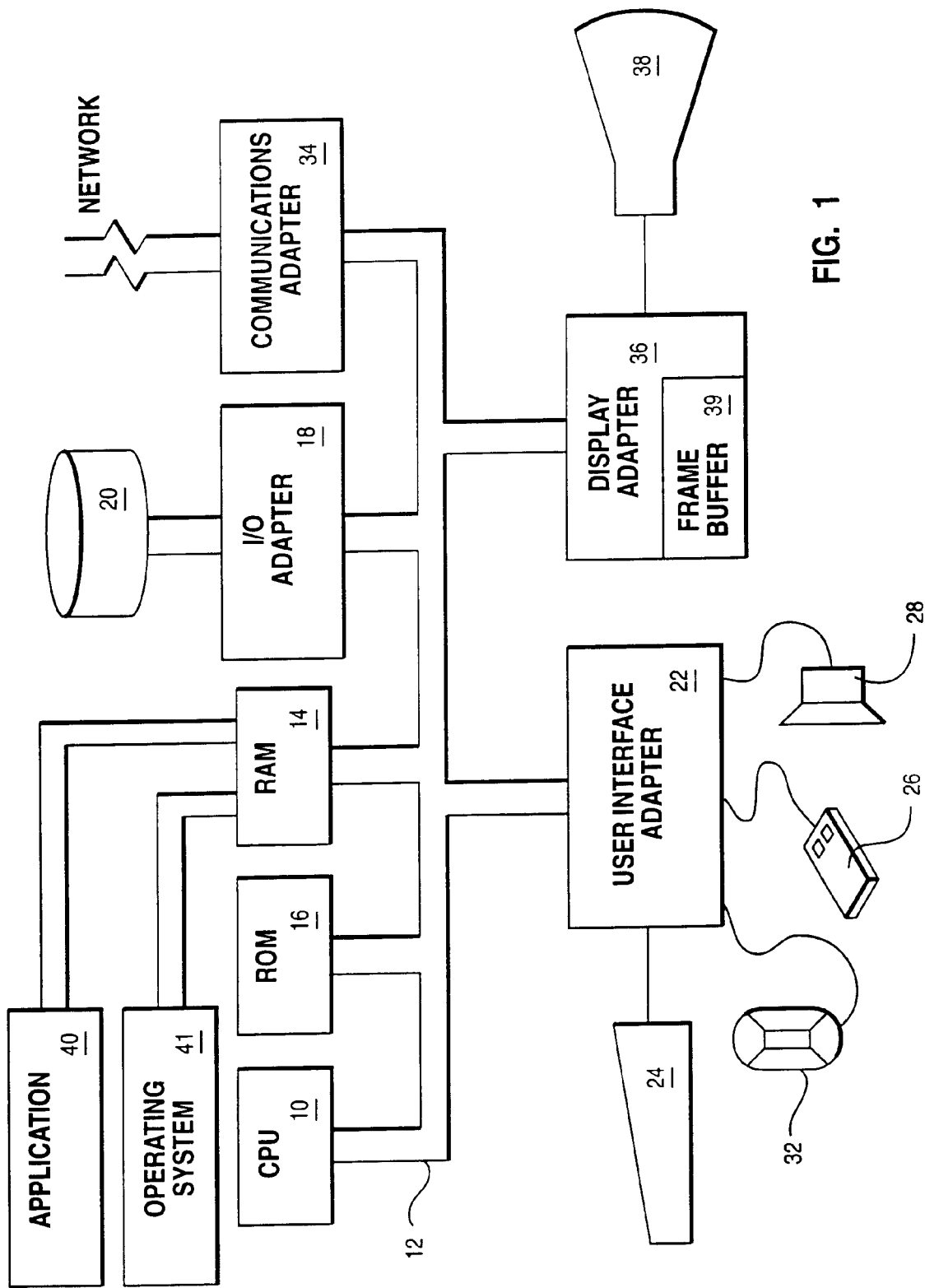
FIG. 1 is a block diagram of a data processing system including a central processing unit and network connections via a communications adapter which is capable of implementing a user interactive workstation on which the received data may be converted into a Web page in accordance with the present invention.

Referring to FIG. 1, a typical data processing system is shown which may be used in conjunction with HTML in implementing the present invention on the receiving interactive workstation. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation) or the Windows 95 system (a trademark of and available from Microsoft Corporation). Any conventional network browser system involving HTML language with embedded hotspots or links forms part of application 40, runs in conjunction with operating system 41 and provides output calls to the operating system 41 which implements the various functions to be performed by the HTML application 40. Also included in the application software 40 will be the application modifications of this invention for providing the hotspots only alternate version of Web pages. The browser program operates in combination with the program of the present invention, or the program of this invention could desirably be incorporated into the browser program. The browser program, in combination with the operating system, provides the basic receiving workstation on which the Web pages are received and on which the program of the present invention may be implemented.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components, i.e. the operating system 41 and applications 40 including the HTML and browser modified to provide the alternate Web pages, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the workstation to communicate with Web servers to receive document pages over a local area network (LAN) or wide area network (WAN) which includes, of course, the internet or World Wide Web. I/O devices are also connected to system bus 12 via user interface adapter 22 and display adapter 36. Keyboard 24, trackball 32 and mouse 26 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and other information to the system through the trackball 32 or mouse 26 to make his selection of the alternate page version containing hotspots only via display 38.

Figure 2:
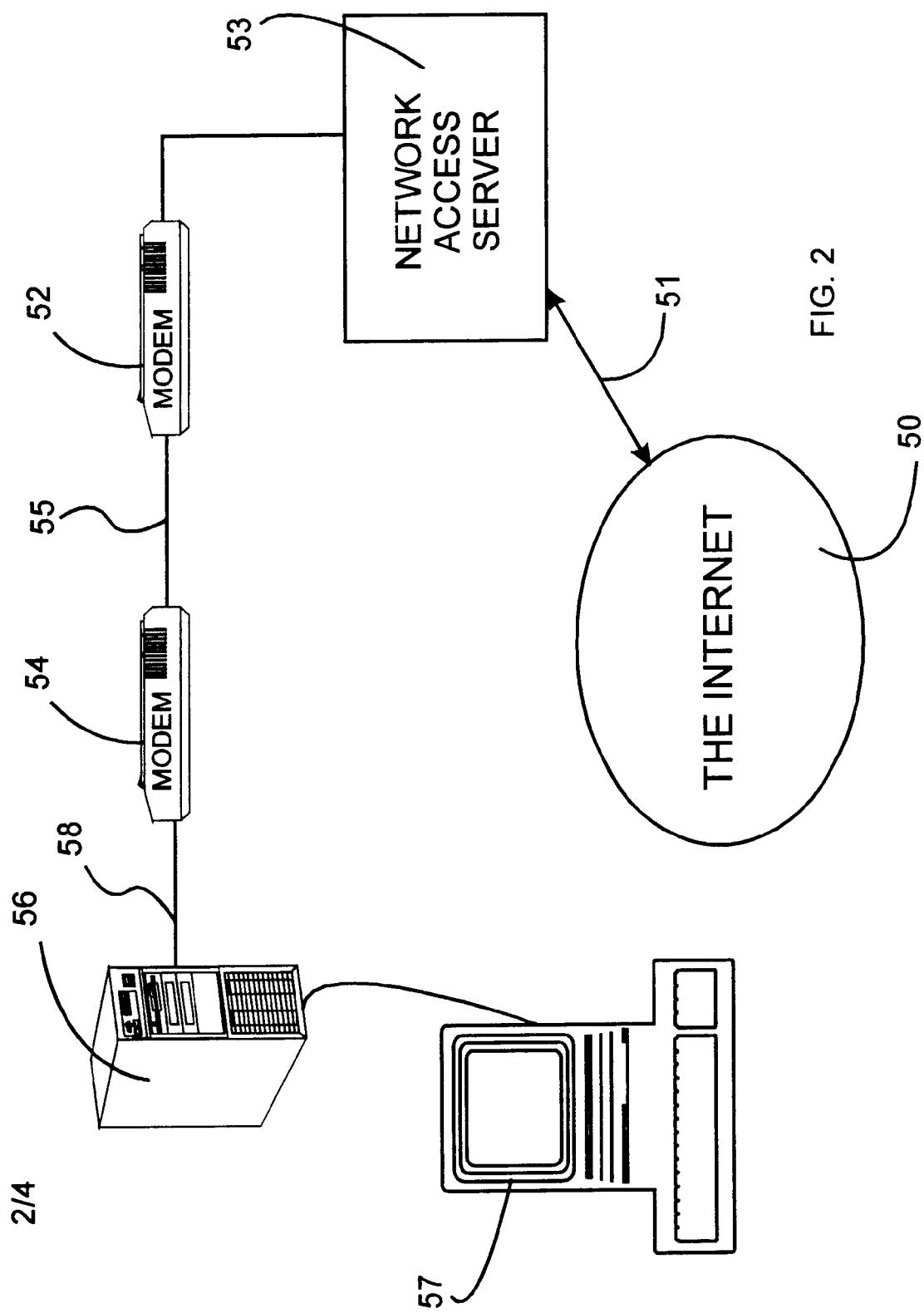
FIG. 2 is a generalized diagrammatic view of an internet portion upon which the present invention may be implemented.

A generalized diagram of a portion of an internet which the computer 56 controlled display terminal 57 used for Web page or other document display of the present invention is connected as shown in FIG. 2. Computer 56 and display terminal 57 are the computer system shown in FIG. 1 and connection 58 (FIG. 2) is the network connection shown in FIG. 1. Reference may be made to the above-mentioned Cady et al. text, particularly pp. 136–147, for typical connections between local display workstations to the internet via network servers, any of which may be used to implement the system on which this invention is used. The system embodiment of FIG. 2 is one known as a host-dial connection. Such host-dial connections have been in use for over 30 years through network access servers 53 which are linked 51 to the net 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the internet 50 via linkage 51. In accordance with the present invention, the user at display terminal 57 is prompted by the program on computer 56 to make his selections as to which version, hotspots only or full to transmit. These choices are conveyed to the server 53 usually via the browser program and, in turn, carried out by the server 53.

Before proceeding with specific software embodiments, some additional background information should be considered. Because of the ease and availability of Web browsers, an almost unimaginable number and variety of pages and topics are available at low cost to tens of millions of users. Unlike other database access systems, everyone on the Web has the ability to incorporate additional information. Also, as has been set forth earlier, in the era of the Web, anyone and everyone can design a Web page. As a result, pages are frequently designed by developers without usability skills.

The present invention, as has been set forth hereinabove, avoids needless excessive downloading and browsing time spent dealing with unneeded text and images.

The present invention is preferably implemented on the net browser in combination with standard browser functions. A graphical user interface is provided within the browser which would prompt the user to indicate selection of the alternate hotspots only version of Web pages. If the user selects the hotspots only versions, then the browser requests the network server to transmit that version to the receiving display station.

Figure 3:
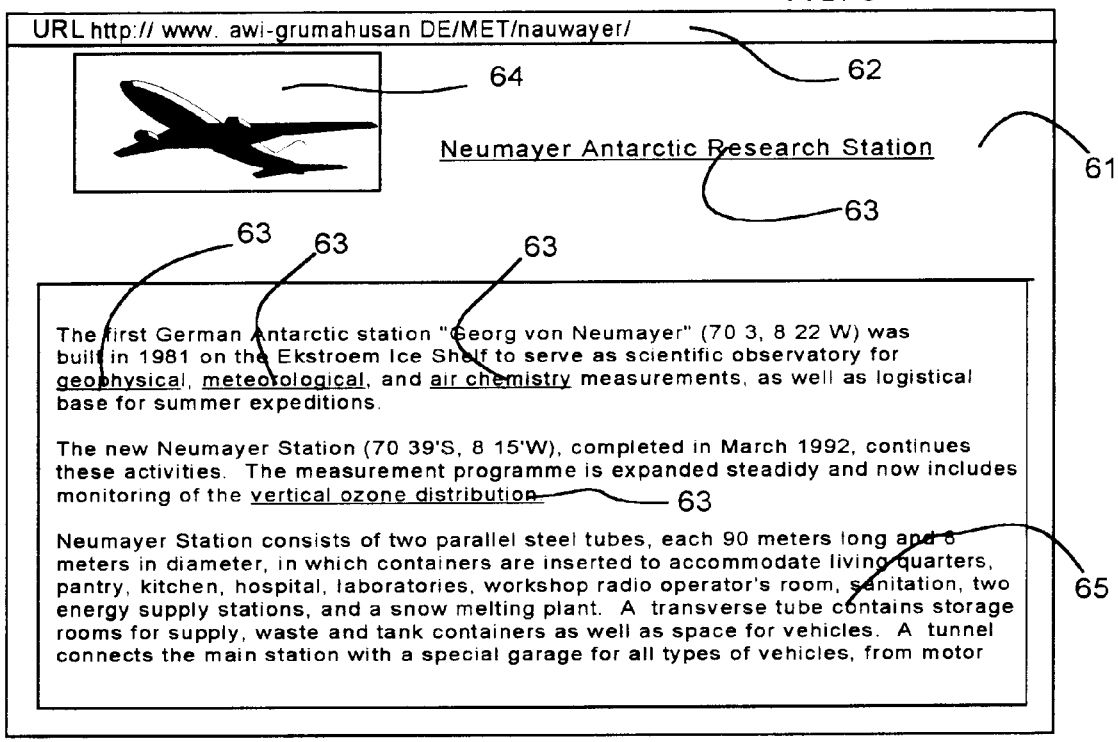
FIG. 3 is a diagrammatic view of a typical Web page including the hotspots.
Figure 4:
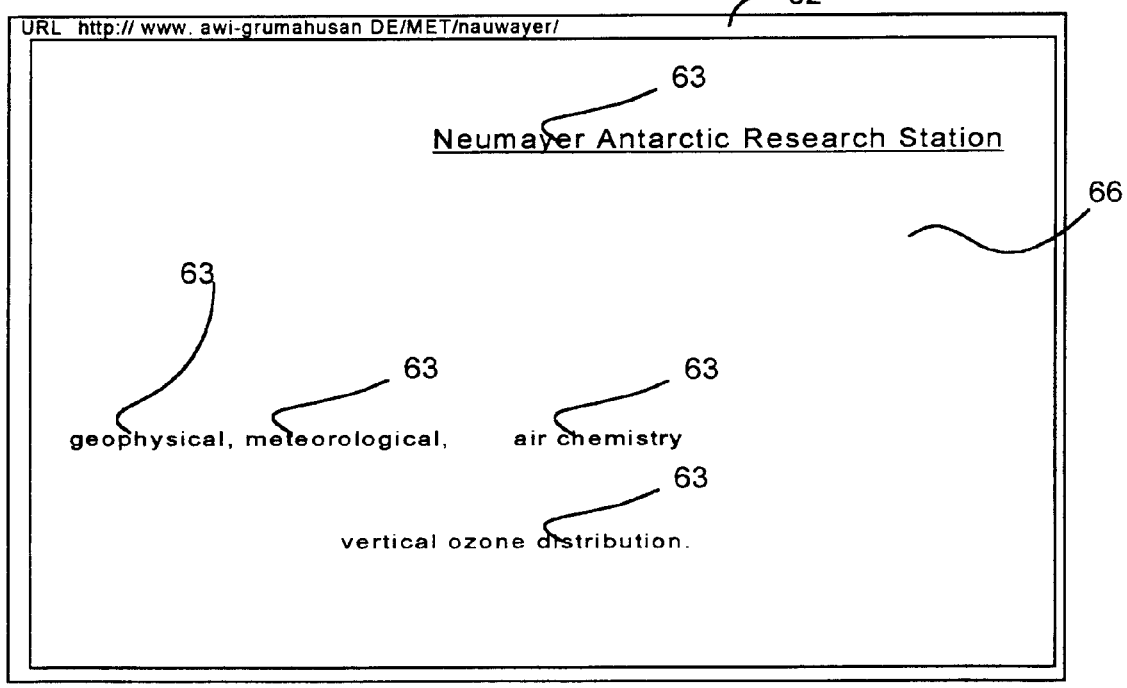
FIG. 4 is a diagrammatic view of a Web page of FIG. 3 with all nonhotspot text and images removed to show only the hotspots.

The advantages of the present invention may be readily seen with respect to FIGS. 3 and 4. FIG. 3 is a diagram of a typical Web page 61 which may be received via the World Wide Web. It contains hotspots or links, such as terms 63. On the present page, these have been received and underlined to designate them as hotspots or links. In the description which follows, "hotspots" and "links" may be used interchangeably to indicate the anchors which are embedded in Web pages to link the user to other pages and data sources. Hotspot or anchor is the more exact technical term used to designate a linkage; but link is widely used, as in the flowchart of FIG. 5 hereinafter. The page also contains, of course, text 65 and image 64. It also contains a head or header 62. When the user selects the links-only or hotspot only alternative version of the page, he gets the page 66 shown in FIG. 4, which, in addition to head 62, only shows links 63. Text 65 and image 64 of FIG. 3 are gone. It should be understood that in this links-only version many layout variations for the remaining links 63 could be implemented. For example, the links could be aligned in a single column or in a single row.

Figure 5:
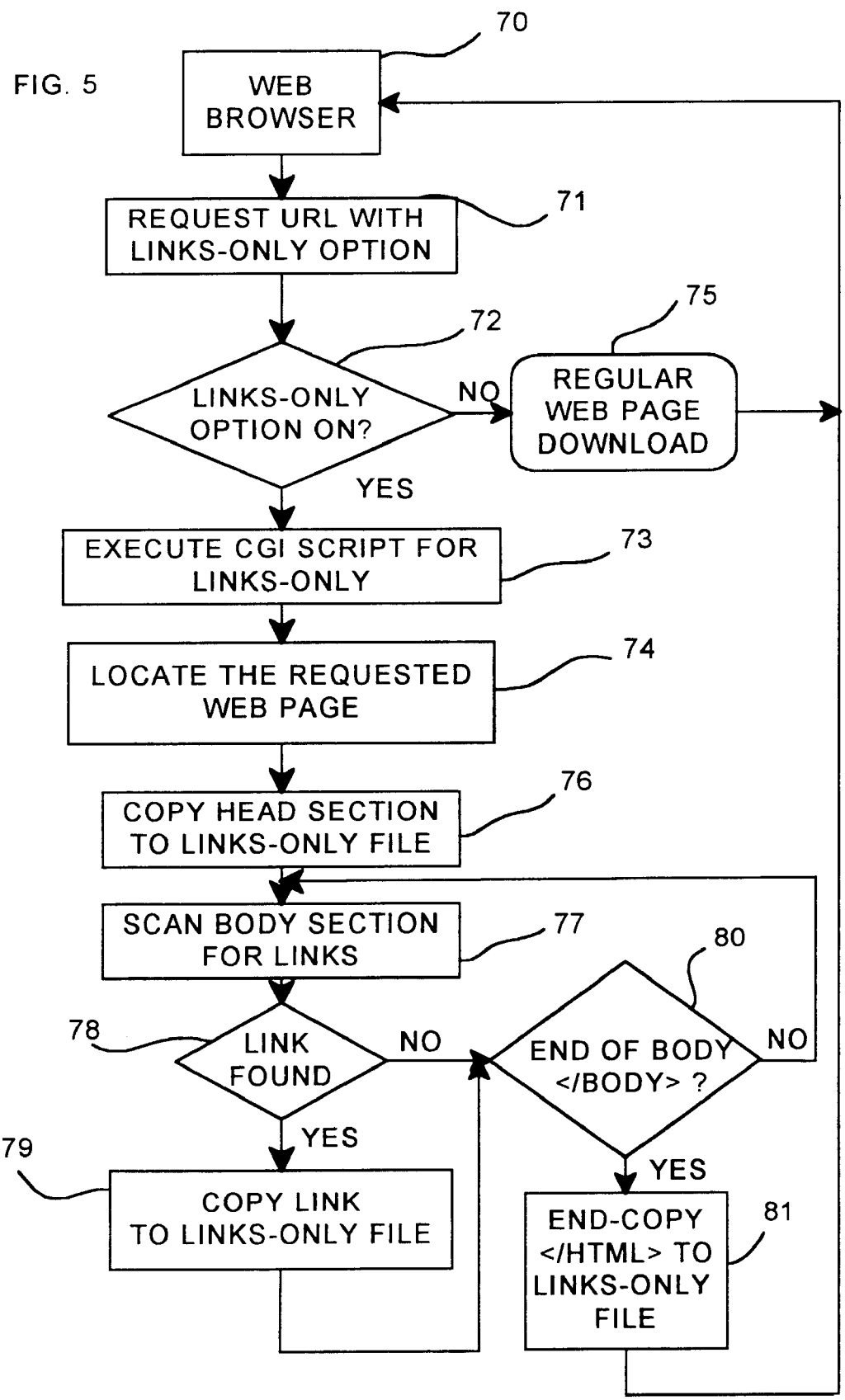
FIG. 5 is a flowchart of a program which may be used to dynamically generate a Web page interface having the hotspots only page of FIG. 4.

Now with respect to the flowchart of FIG. 5, we will describe an embodiment of the invention. When illustrative tags or code are given, they will be in HTML. The program may be desirably incorporated in any conventional browser program such as Internet Explorer or Netscape. The display station in FIG. 2 is made up of display 57 controlled by computer 56 which has a browser such as Netscape or Internet Explorer modified in accordance with this invention. Thus, FIG. 5, the user, via the browser 70, requests a particular URL (Uniform Resource Locator) using the links-only option, step 71. The browser sends to the network server 53 (FIG. 2), a message which, for example, could be a character string in a CGI (Common Gateway Interface) format, e.g.:

"http://cgi_server/cgi-bin/the_url?links-only"

In response, the server 53 (cgi_server) determines via decision step 72, FIG. 5, if the user has selected the links-only (hotspot only) option. If No, then there is a normal full Web page download, step 75, to the receiving display station, 56, 57. If Yes, then, step 73, the server 53, FIG. 2, executes the process for links-only. The Web page file specified by the URL is located, step 74. Then the head section which is all of the data in the page file from the beginning up to the <BODY> tag is copied to a links-only file copy, step 76. Then, step 77, the data in the body section of the page is scanned for HTML links. These links are located by searching for the standard HTML <A HREF=" . . ."> and </A> tags. Next, decision step 78, if a link is found and the link is not a local link, i.e. it does not refer to an anchor or hotspot within the same document, then the link is copied to the links-only file, step 79. In this connection, it should be noted that a local link can be detected by its leading '#' in the HREF definition. Also, it may be advantageous to generate a line break (<BR>) after each link stored in the links-only file to enhance readability. After step 79 or, if in step 78, there is no link found, the process moves to decision step 80 where it is determined whether we are at the end of the body section; this is marked by the </BODY> tag. If Yes, end the links-only file by a </HTML> tag, step 81, and send the links-only file to the browser, step 70, which may now display the links-only file. If the decision from step 80 is No, indicating that we are not at the end of the page body, then the process returns to step 77 and the page body is scanned for further links.

Although certain preferred embodiments have been shown and described, it will be understood that many changes and modifications may be made therein without departing from the scope and intent of the appended claims.

What is claimed is:

1. In a computer managed communication network with user access via a plurality of data processor controlled interactive display stations and with a system for displaying hypertext documents including a sequence of at least one display page transmitted to said display stations from locations remote from said stations, the improvement comprising:

means for providing said display page in an original version including text, images and a plurality of hotspots, each hotshot being responsive to user interactive pointing means to display a respective linked document, means for providing said display page in an alternate version wherein only the hotspots on the page are displayed, means for selecting said alternate version for display, and means, responsive to said means for selecting, for transmitting said alternate version containing hotspots only to a receiving display station.

2. The communications network of claim 1 wherein said means for selecting said alternate version having hotspots only is located at said receiving display station.

3. The communications network of claim 2, further including at least one network server having means for fetching said documents from said network and transmitting said fetched documents to said receiving station, said means for providing said display page in said alternate version having hotspots only, and said means, responsive to said means for selecting, for transmitting said alternate version.

4. The communications network of claim 3 wherein said receiving display station further includes a user interactive network browser, said browser including said means for selecting said alternate version for display.

5. In a computer managed communication network with user access via a plurality of data processor controlled interactive display stations and with a system for displaying documents including a sequence of at least one display page transmitted to said display stations from locations remote from said stations, a method for simplifying the user interface to hotspots at a document receiving display station comprising:

providing said display page in an original version including a sequence of at least one display page containing text, images and a plurality of hotspots, each hotspot being responsive to user interactive pointing means to display a respective linked document, providing said display page in an alternate version wherein only the hotspots on the page are displayed, selecting said alternate version for display, and transmitting said alternate version containing hotspots only to said receiving display station in response to said selection.

6. The method of claim 5 wherein said step of selecting said alternate version for display is carried out at said receiving display station.

7. The method of claim 6, further including at least one network server on which are carried out the steps of:

fetching said documents from said network and transmitting said fetched documents to said receiving station, providing said display page in said alternate version having hotspots only, and transmitting said alternate version containing hotspots only to said receiving display station in response to said selection.

8. The method of claim 7 further including a network browsing method carried out on said receiving display station, said browsing method including said step of selecting said alternate version for display.

9. In a computer program having data structures included on a computer readable medium for browsing a computer managed communication network via a data processor controlled user interactive receiving display station in order to display on said receiving display station, documents including at least one display page transmitted to said station from network locations remote from said receiving station, the improvement comprising:

means for providing said display page in an original version including text, images and a plurality of hotspots, each hotspot being responsive to user interactive pointing means to display a respective linked document, means for providing said display page in an alternate version wherein only the hotspots on the page are displayed, means for selecting said alternate version for display, and means, responsive to said means for selecting, for transmitting said alternate version containing hotspots only to a receiving display station.

10. The computer program according to claim 9 wherein said means for selecting said alternate version having hotspots only is located at said receiving display station.

11. The computer program for browsing according to claim 10 wherein said program is designed to be run on said receiving display station.

* * * * *